US009626830B2

(12) United States Patent
Acres

(10) Patent No.: US 9,626,830 B2
(45) Date of Patent: Apr. 18, 2017

(54) RESERVE CREDITS FOR USE ON GAMING DEVICE

(75) Inventor: John F. Acres, Las Vegas, NV (US)

(73) Assignee: PATENT INVESTMENT & LICENSING COMPANY, Las Vegas, NV (US)

( * ) Notice: Subject to any disclaimer, the term of this patent is extended or adjusted under 35 U.S.C. 154(b) by 1071 days.

(21) Appl. No.: 12/486,640

(22) Filed: Jun. 17, 2009

(65) Prior Publication Data

US 2010/0323788 A1 Dec. 23, 2010

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/3244* (2013.01); *G07F 17/32* (2013.01); *G07F 17/3283* (2013.01)

(58) Field of Classification Search
CPC ........................................................ G07F 17/32
USPC ........................................................ 463/16–21
See application file for complete search history.

(56) References Cited

U.S. PATENT DOCUMENTS

| | | | | |
|---|---|---|---|---|
| 6,003,013 | A * | 12/1999 | Boushy et al. | 705/7.33 |
| 6,293,865 | B1 * | 9/2001 | Kelly et al. | 463/16 |
| 2001/0012797 | A1 * | 8/2001 | Walker et al. | 463/25 |
| 2002/0132660 | A1 * | 9/2002 | Taylor | 463/16 |
| 2003/0003983 | A1 * | 1/2003 | Walker et al. | 463/16 |
| 2003/0157979 | A1 * | 8/2003 | Cannon | G07F 17/42 463/16 |
| 2006/0199634 | A1 * | 9/2006 | Anderson et al. | 463/20 |
| 2006/0211470 | A1 * | 9/2006 | Walker et al. | 463/16 |
| 2008/0064475 | A1 * | 3/2008 | Okada | 463/20 |

* cited by examiner

*Primary Examiner* — Kevin Y Kim
(74) *Attorney, Agent, or Firm* — Marger Johnson

(57) ABSTRACT

Embodiments of the present invention are directed to methods and apparatus in which a player plays one of a plurality of networked gaming devices. Game awards below a predefined level are tracked and stored on the network. If the game awards are less than a predefined criterion, a pay command is sent over the network to the player's gaming device, which may be used for a free game. Implementation in a single gaming device is also disclosed.

31 Claims, 12 Drawing Sheets

RESERVE CREDITS FOR USE ON GAMING DEVICE

FIELD OF THE INVENTION

This disclosure relates generally to gaming devices and more particularly to electronic gaming devices of the type that accept wagers from players and pay awards for winning outcomes.

BACKGROUND

Such electronic gaming devices can be set to provide a predetermined payback to players. In other words, for all amounts wagered a set percentage, e.g., in the range of 92-98%, is returned to players of the gaming device in the form of awards associated with winning outcomes for the game. Because the gaming devices generate random outcomes, the payback percentage calculated based on historical wagers and awards may deviate significantly from a long-term average over a single playing session. This deviation may be in either direction, i.e., a player may experience a streak of either winning or losing outcomes.

Most players experiencing a streak of losing outcomes feel discouraged. From the standpoint of the operator of the gaming devices, e.g., a casino, it is especially disadvantageous for a new player or a relatively new player to experience a losing streak. Studies have shown that players who have an early negative gaming experience at a new location do not return often and may even exclude it entirely in view of a losing experience.

It would be desirable to recognize when a player has had a losing experience and compensate him or her in some fashion. Ideally, the compensation should come in a manner that enhanced the player's gaming experience.

DETAILED DESCRIPTION

Figure 1A:
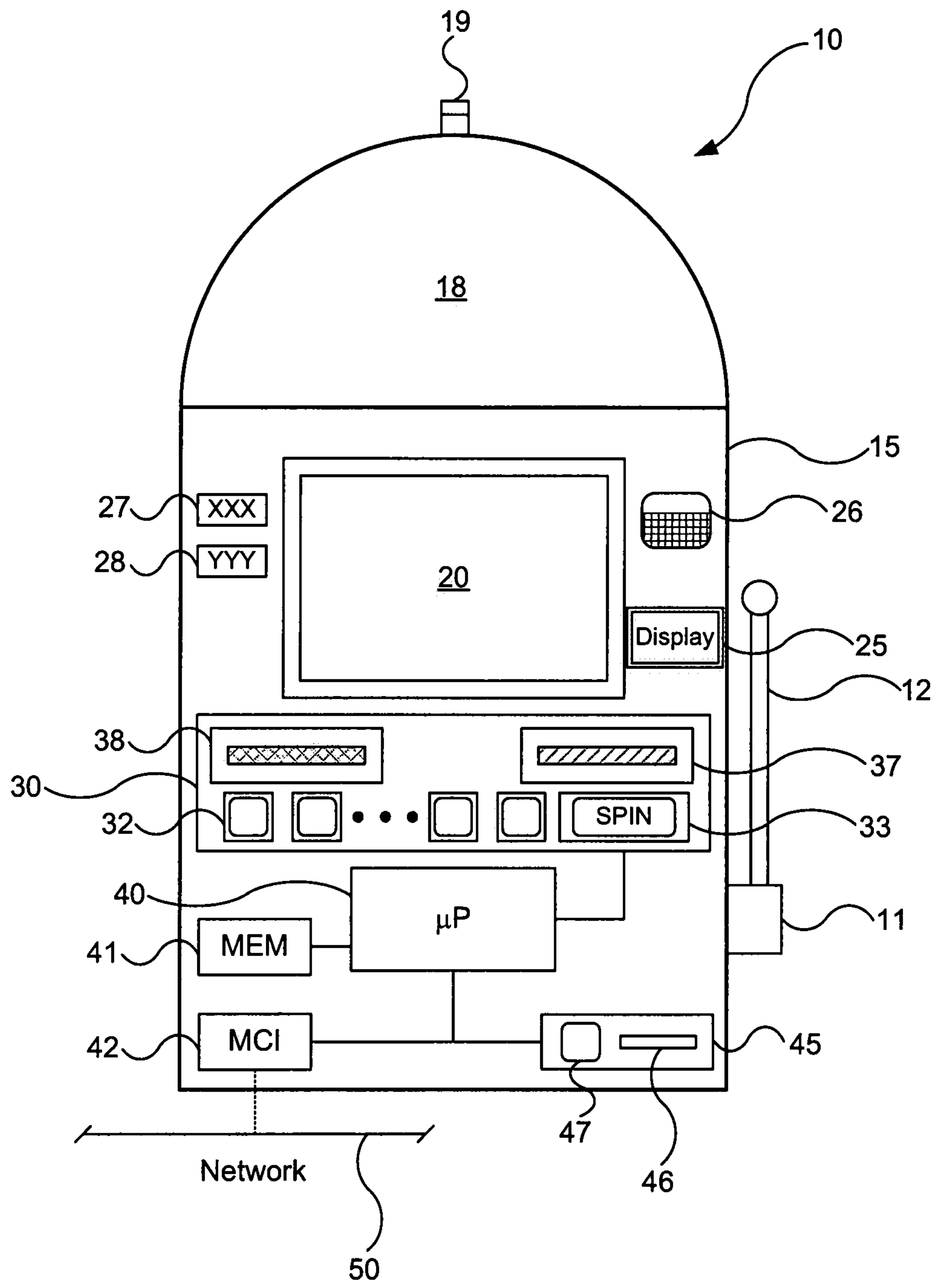
FIG. 1A is a functional block diagram that illustrates a gaming device according to embodiments of the invention.
Figure 1B:
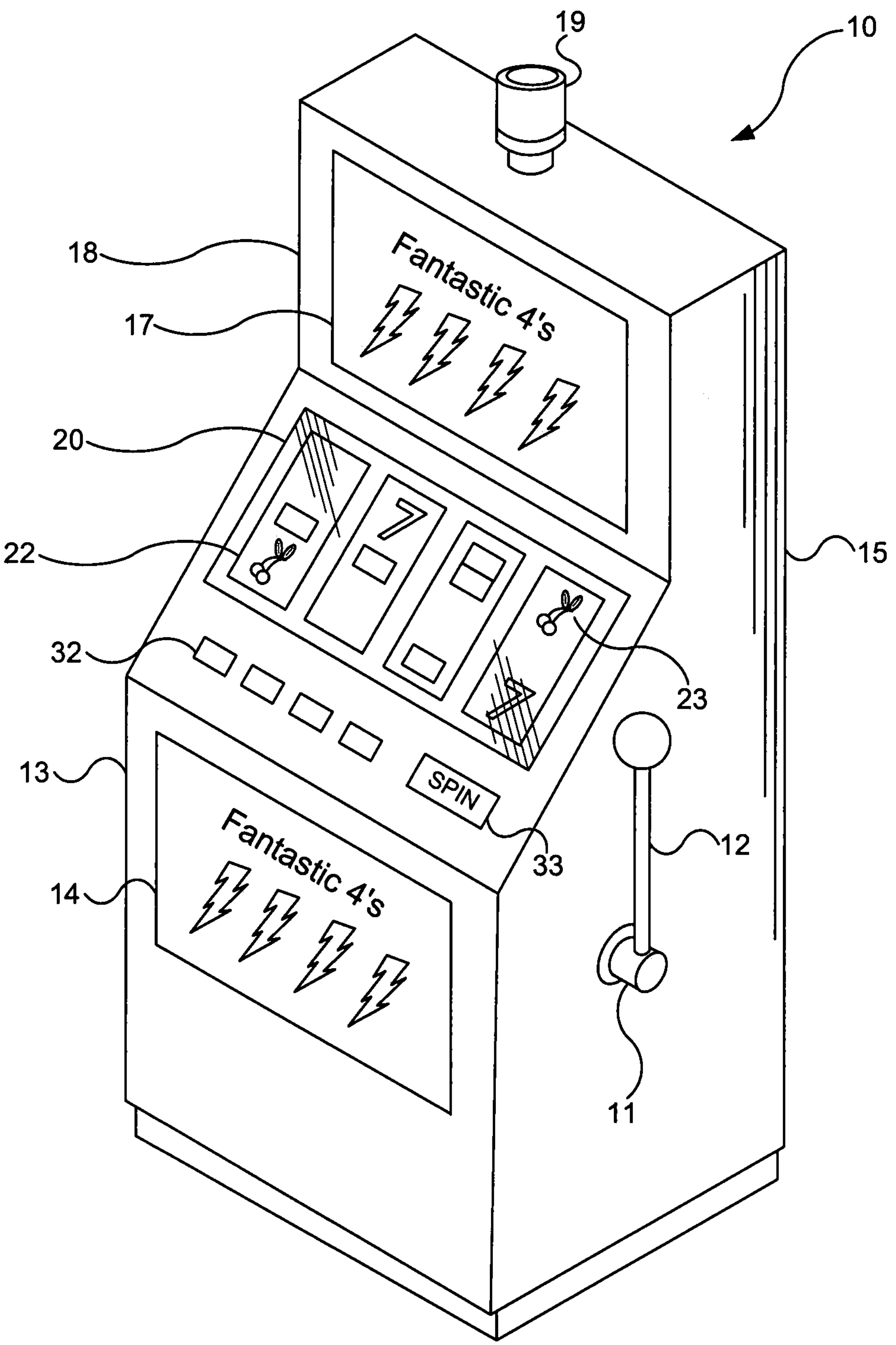
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electromechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
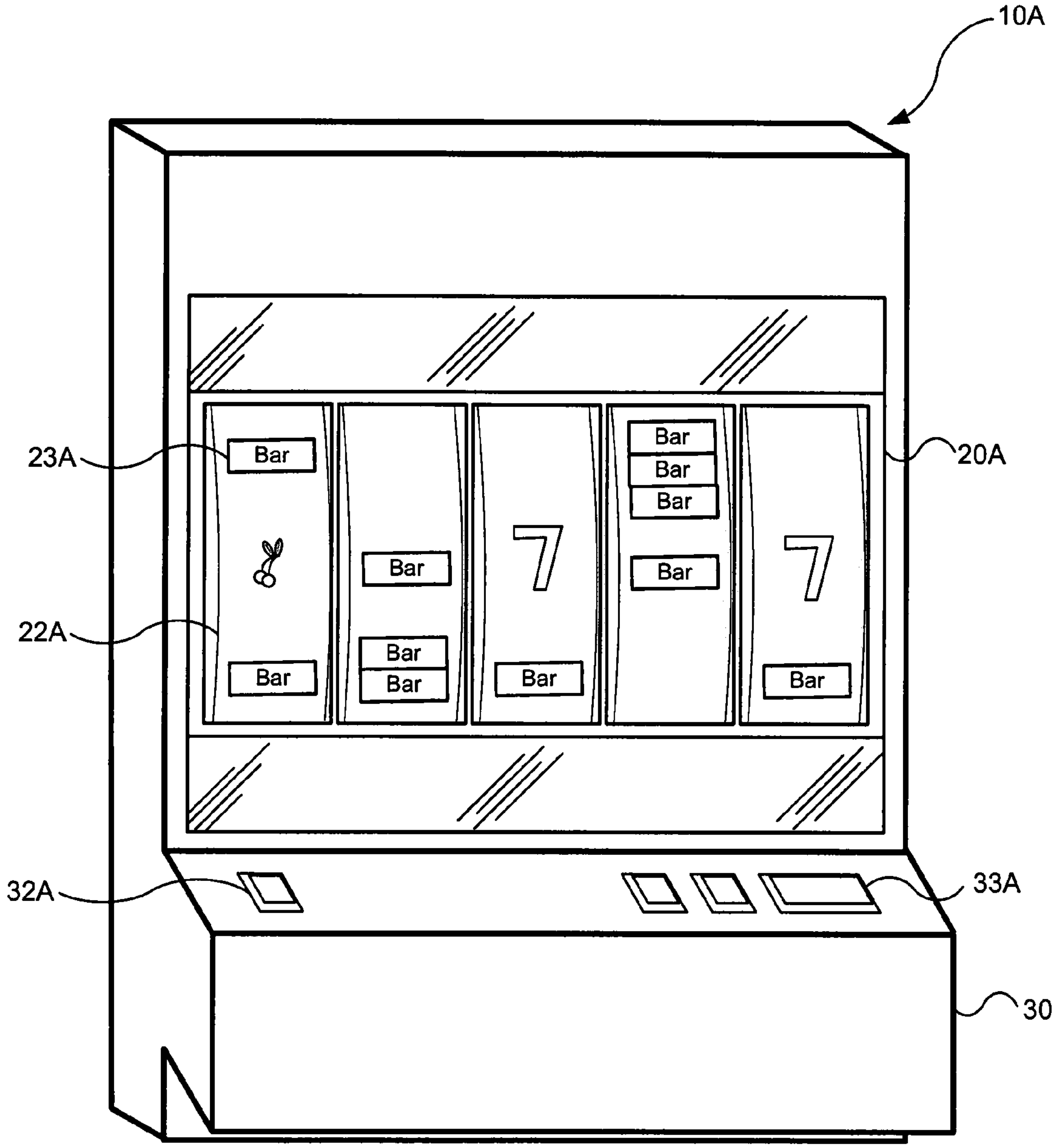
FIGS. 2A, 2B, and 2C are detail diagrams of exemplary types of gaming devices according to embodiments of the invention.
Figure 2B:
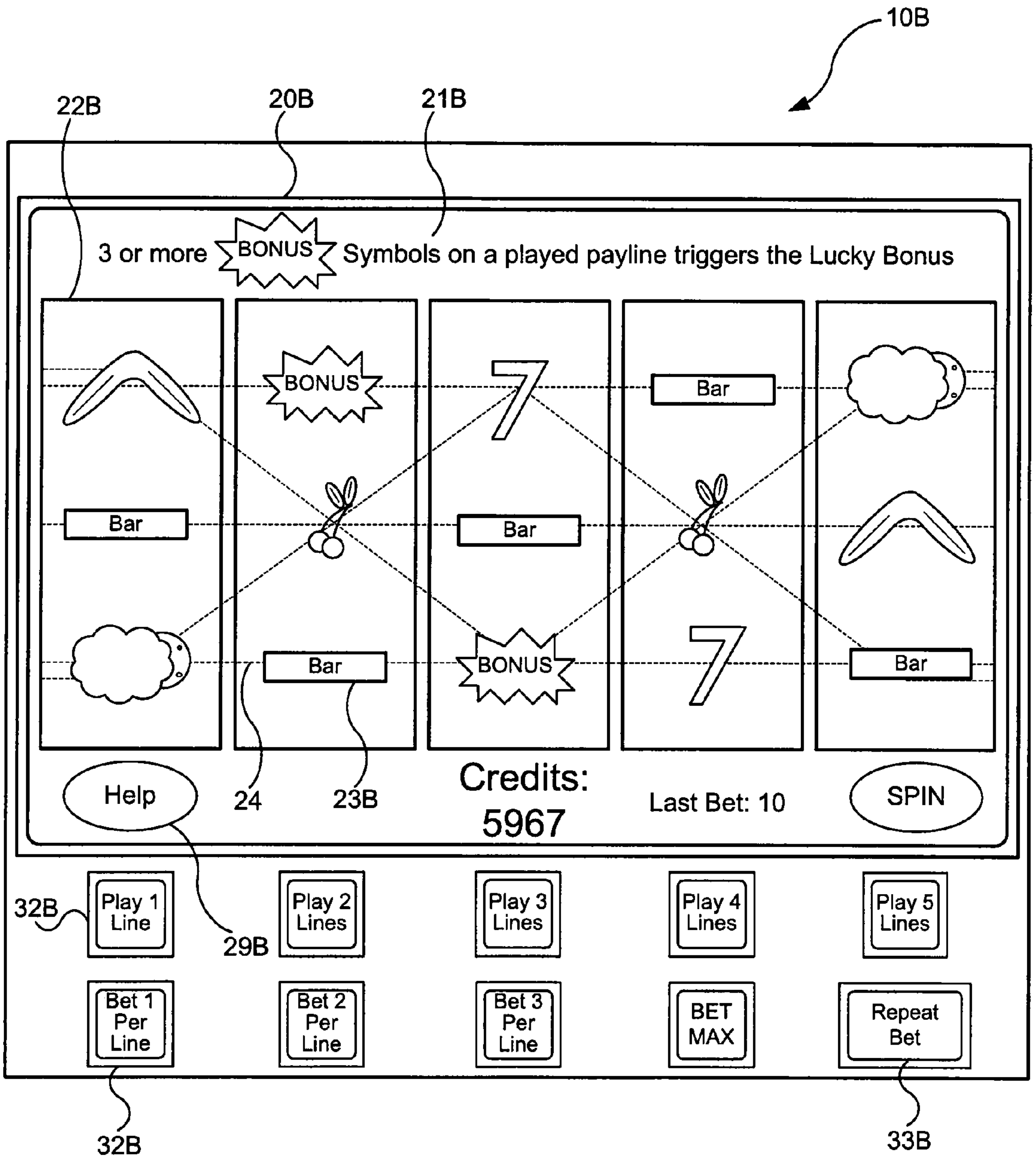
Figure 2C:
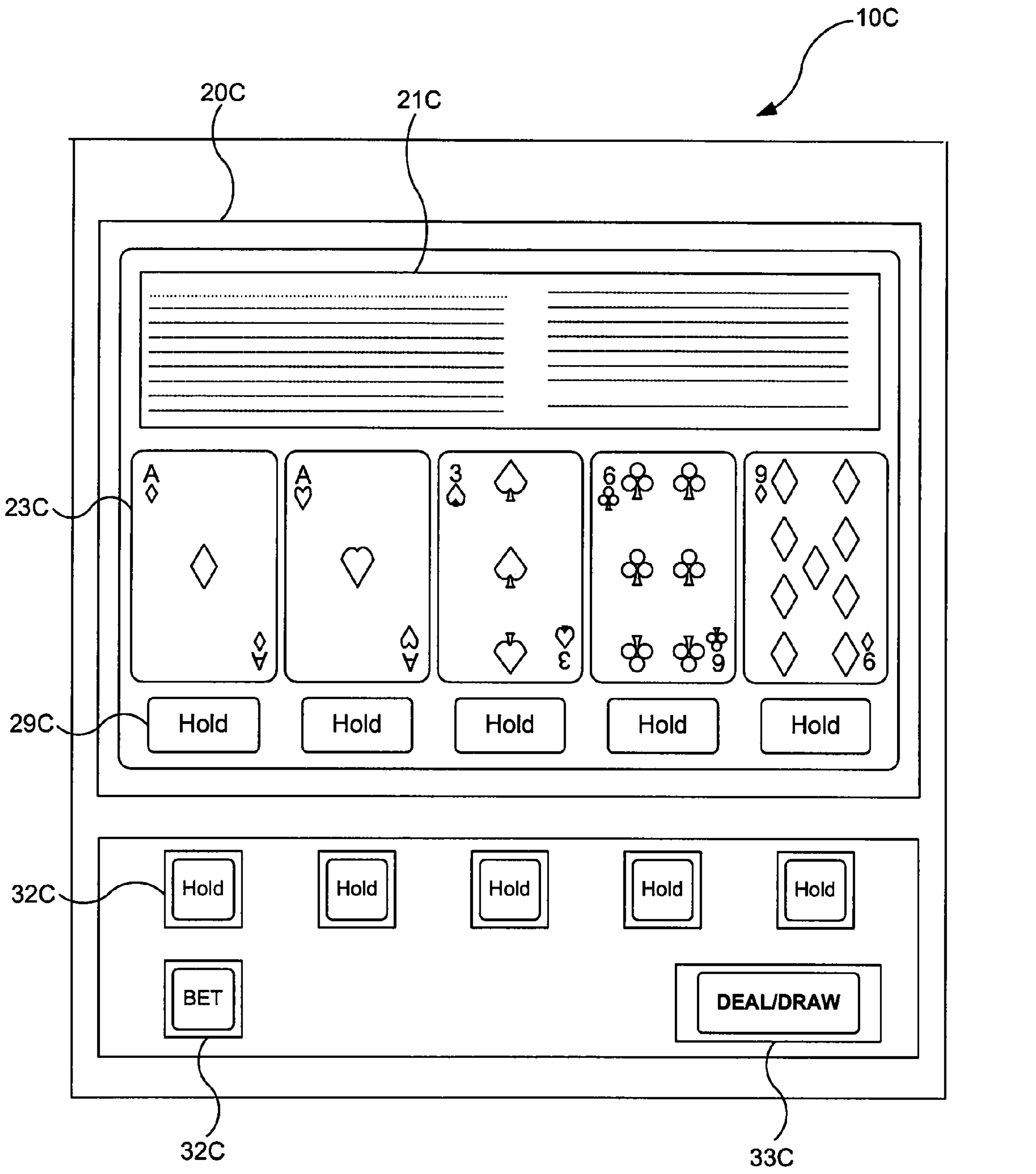

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touch-screen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
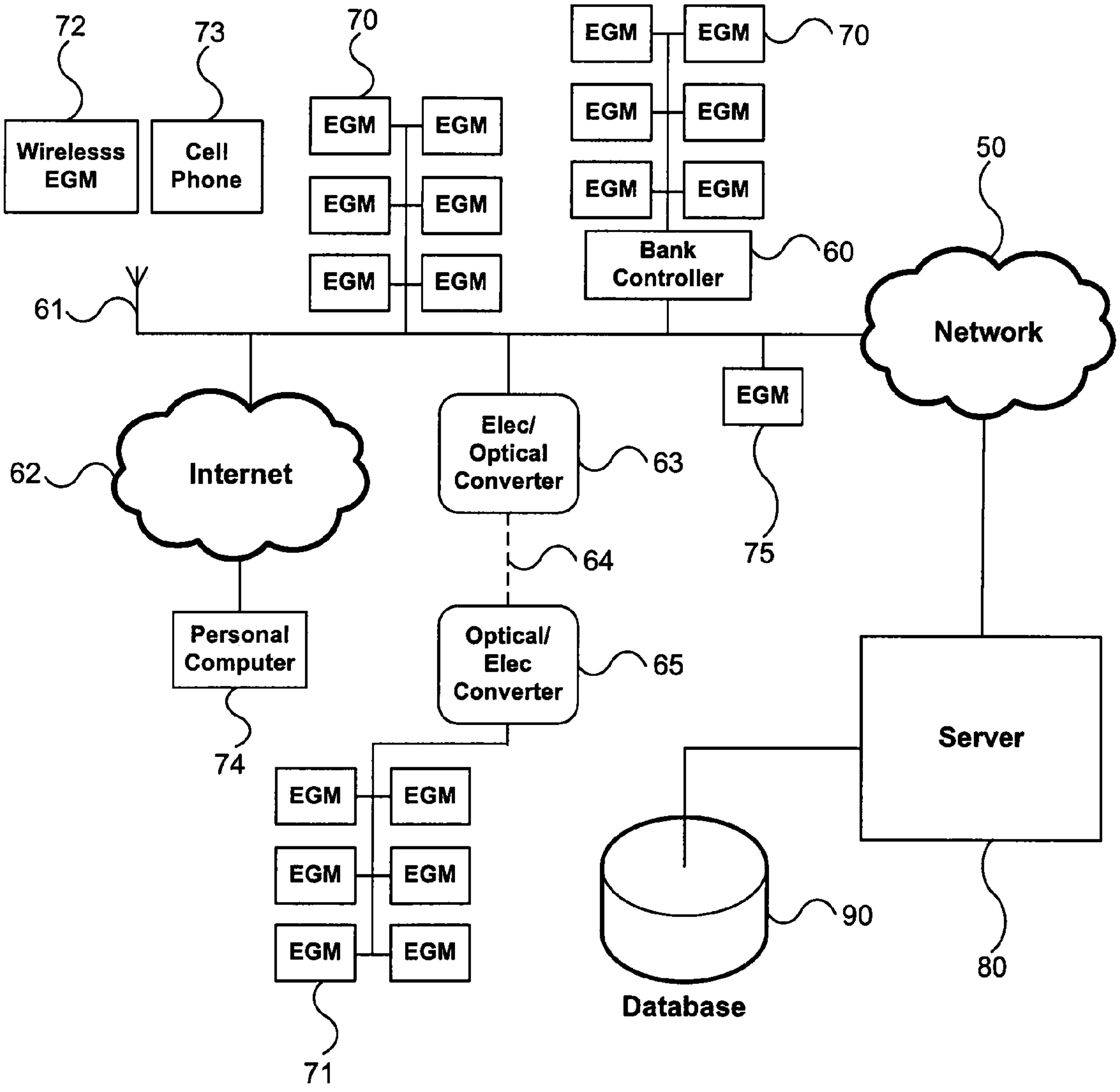
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
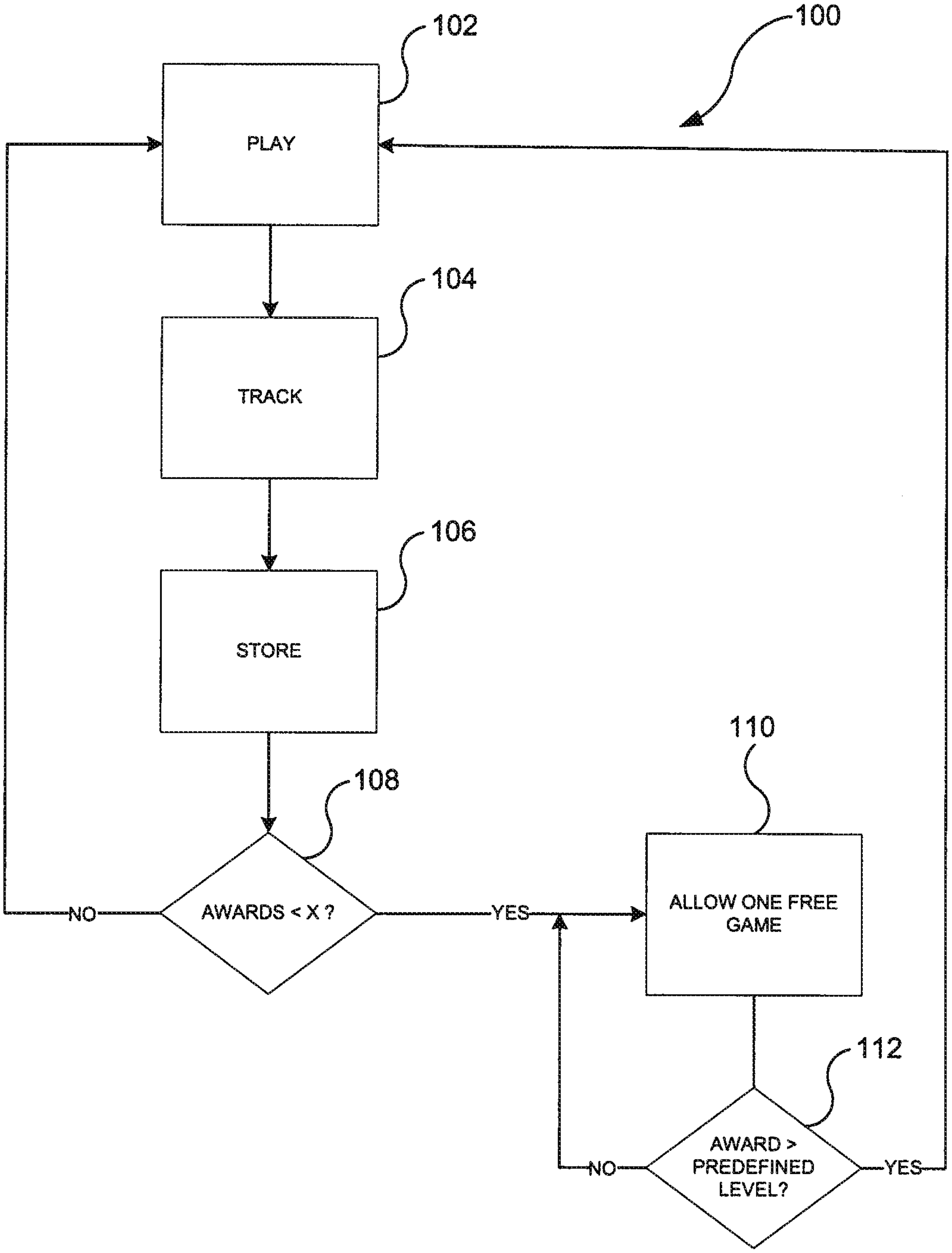
FIG. 4 is a flow chart depicting operation according to an embodiment of the invention.

Turning now to FIG. 4, consideration will be given to an embodiment according to the present invention. Indicated generally at 100 is a process that depicts operation of the disclosed embodiment. As will become apparent, process 100 could be implemented on a single gaming machine or it could be implemented on a plurality of gaming machines via network 50. In a network implementation, process 100 could be software operatively connected to the network, either at a single location, such as at server 80 or a similar server, or distributed on the network. The following description relates to a network implementation. Implementation on a single game will be described in connection with FIG.9.

At 102, a player is permitted to play gaming device 10. The player, in the present example, is enrolled in the player tracking system, and his or her play is tracked via the player tracking system and network at 104. Such tracking typically includes all awards made to the player but might include only tracking awards that are below a predefined level. In any event, such awards are obviously tracked when all awards are tracked. It should be appreciated that the present invention may be equally well implemented with a player who is not enrolled, but whose play is tracked and stored anonymously by the player tracking system or by a system dedicated to implementing the present embodiment.

Tracking game awards that are below a predefined level can have many possible meanings. For example, this could be the total amount of money lost by the player. Or it could comprise consecutive losses after an initial wager. It also may comprise tracking consecutive game awards that are each below a predefined level. There are obviously many other ways to track game awards that are below a predefined level.

At 106, the tracked awards are stored at a storage device located on network 50. The storage device may include database 90 or other databases or storage devices operatively connected to the network. At 108, the tracked data is checked to see if the awards to the player are less than a predefined criterion. Like tracking awards below a predefined level, checking to see if the awards to the player are less than a predefined criterion can also have many possible meanings.

For example, the predefined criterion may be an amount of money. And that amount may be a function of at least one of the amount wagered by the player and the amount won by the player. Such a function could be as simple as taking the difference between the two, or it may be related to a ratio of one to the other. On the other hand, it could simply be one or the other, i.e., amount wagered or amount won. Preferably all of the player's cash is exhausted before the predefined criterion is met. It is also possible to establish a predefined criterion related to winnings lost back to the game. For example, if the player has a hot streak and bets all of the awards, which are then lost, the predefined criterion may be met. There are clearly many other ways to establish the predefined criterion.

If, at 108 in FIG. 4, the awards are determined not to be less than a predefined criterion, the player continues play at 102. On the other hand, if the awards are less than a predefined criterion, a pay command is sent over network 50 to the gaming device 10. In the embodiment of FIG. 4, the pay command is communicated via the network and interface 42 to credit meter 27 or to bet meter 28 with enough credit to play one free game. The award of the credit or game may be accompanied by a message to the player that could be delivered on secondary display 25. The message can let the player know that the operator of the gaming device sympathizes with the player in view of the losing streak and is therefore providing some solace. In one implementation, the player is notified of the award made at 110, e.g., via display 25, and is required to take some action, such as pressing a button, before the award is usable to confirm that the player notices the award.

The credit may be cashed out by the player or, preferably, it is a credit that can only be played, i.e., it cannot be cashed out. This free game is played at 110. Any award associated with play of the free game at 110 is checked at 112 to see if it is above a predefined amount. If so, the process returns to 102 where play continues. If not, the player is awarded a further credit for a second additional game. Any award associated with play of the second additional game is also checked at 112 with additional free games being awarded until the first free game that provides an award above the predefined level.

In one embodiment, the award at 110 need not be the result of play only on gaming device 10. For a tracked player, the session results can be stored in the player tracking system, e.g., in database 90. As a result, when the player logs out of the player tracking system, typically by removing a player tracking card, at gaming device 10 and logs in at another gaming device on the network, the player's record of wagers, wins, and losses, "follows" him or her to the next machine. Put simply, process 100 can be implemented over different player sessions or even over different visits, e.g., on different days.

In another option related to moving to another gaming device, the award at 110 may be structured to be usable only at the second gaming device. In other words, the player would be required to move to receive the award. This might be implemented when a casino is urging players to play a new game or is trying to boost interest in under-played games.

Figure 5:
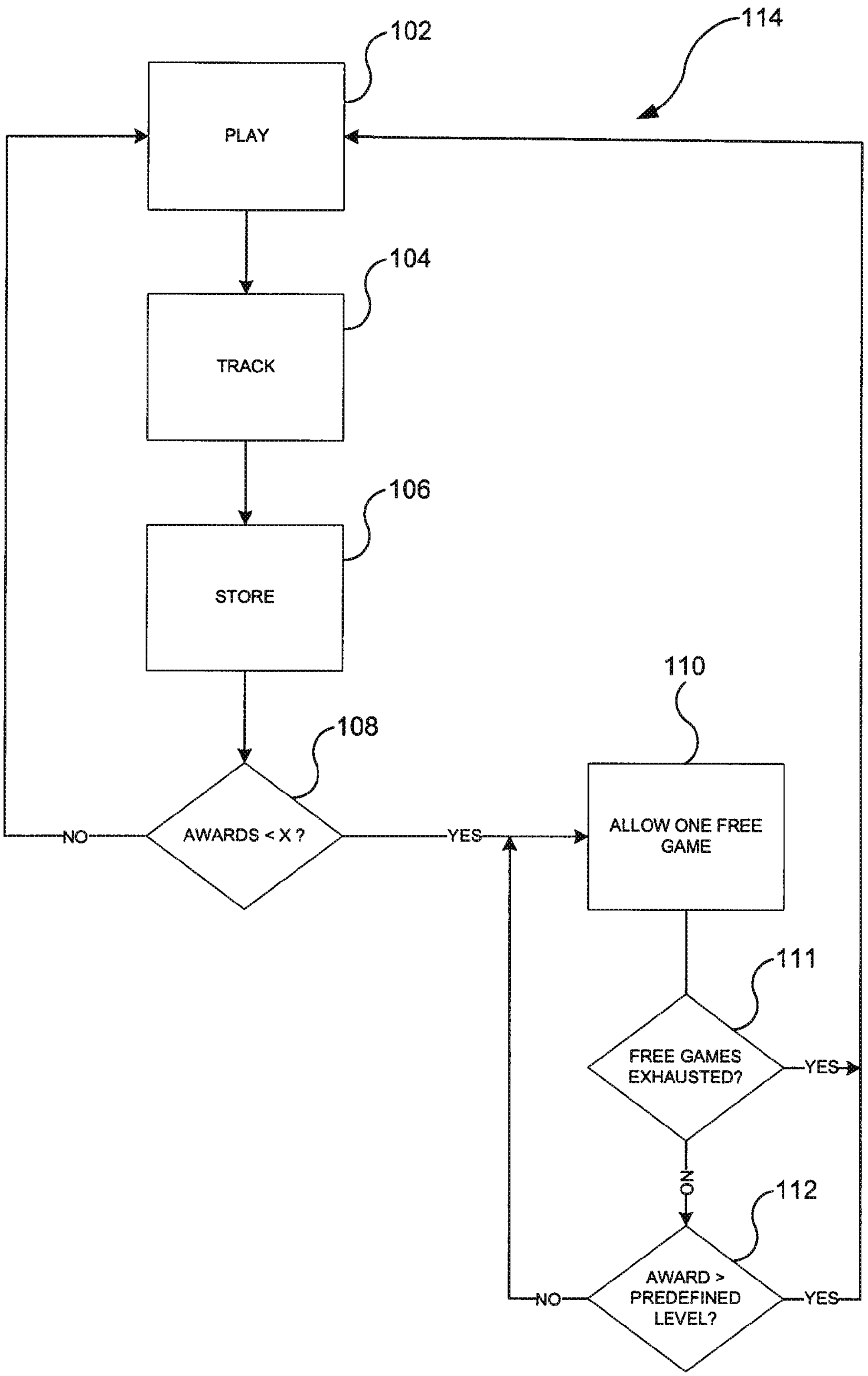
FIG. 5 is a flow chart depicting operation according to another embodiment of the invention.

Turning now to FIG. 5, indicated generally at 114 is a modified version of process 100. Portions of process 100 that remain substantially the same in process 114 retain the same numeral in FIG. 5. In process 114, there may be a limit on the number of free games before the process returns to 102. This limit is checked at 111. If the limit is reached, the process returns to 102, if not the check at 112 is made to see if the award is greater than a predefined level. If so, the process returns to 102 for further play; if not, the process returns to 110 for another free game. In other words, the player may be returned to 110×times (where x=an integer) at 112 before finally being returned to 102 at 111 even if there has not been a win. In any event, after a win—in process 110—or a predefined number of free games that all result in losses—in process 114—the process then returns to 102, and play continues.

Figure 6:
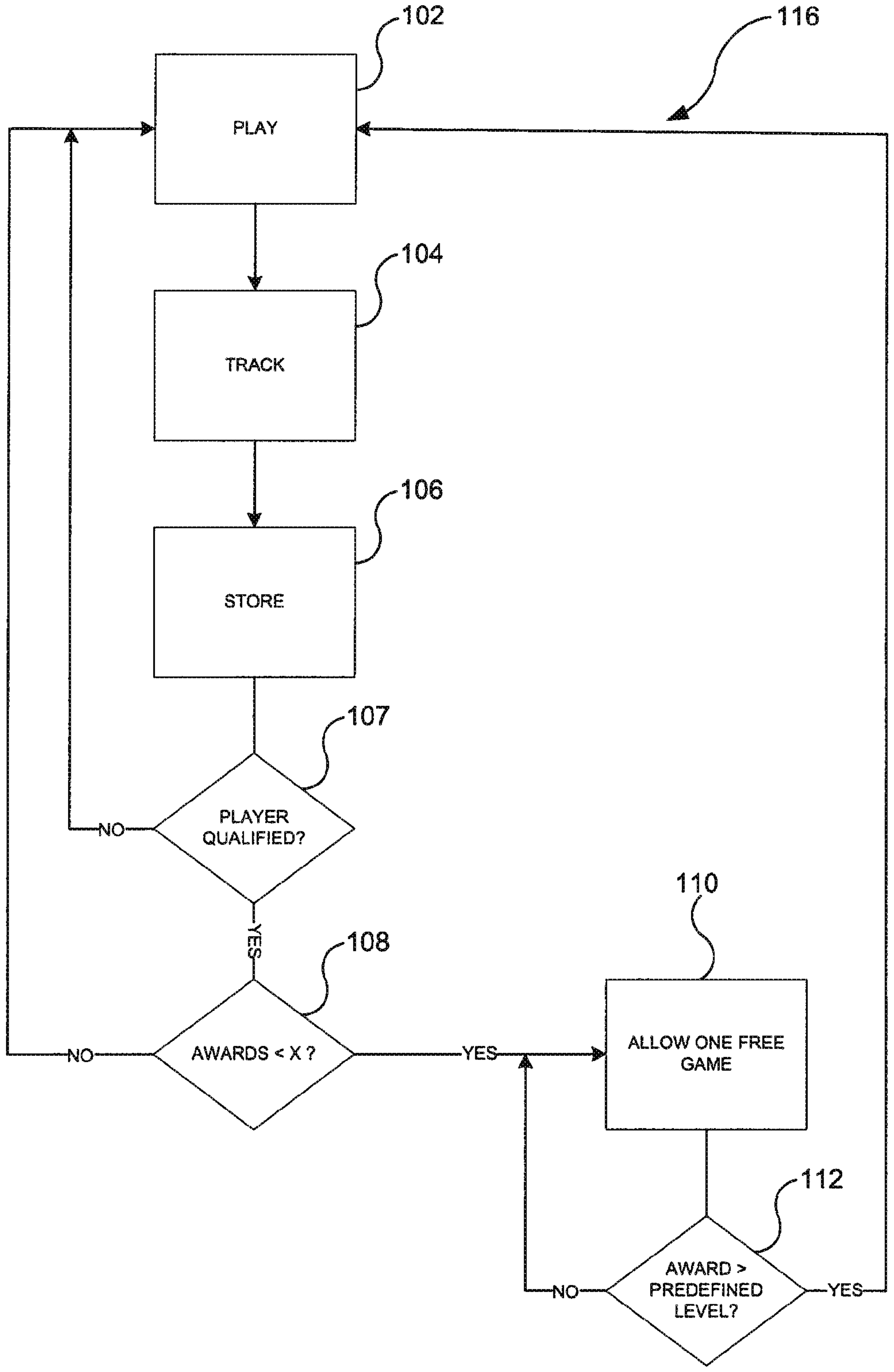
FIG. 6 is a flow chart depicting operation according to still another embodiment of the invention.

Turning now to FIG. 6, indicated generally at 116 is a modified version of process 100. Portions of process 100 that remain substantially the same in process 116 retain the same numeral in FIG. 6. In FIG. 6, after tracked play results are stored at 106, a check is made at 107 to see whether the player qualifies for a possible additional game at 110 regardless of the level of the player's losses. This qualification step allows the operator of the gaming machines to provide the benefits of the process to specified players based on the perceived future worth of the player. For example, the decision made at 107 could simply be that all players who are logged in to the player tracking system will be qualified and those who are not logged in will not be.

Even those who qualify at 107 and wind up at 108 may be further categorized by varying the process at 108 to identify tiers of players who are passed on to the free game at 110 based on different predefined criterion applied to different players at 108. Again, this provides the operator of the gaming devices with the ability to target and reward specific players or groups of players in a way that encourages them to continue playing during the current session and in future sessions and visits. For example, one group of players may be identified as being from a wealthy area based on the zip code used in the address when the player enrolls in the player tracking system. Those players may qualify at a lesser loss than players deemed to be not as worthy and therefore be passed from 108 to 110 earlier in process 116.

Figure 7:
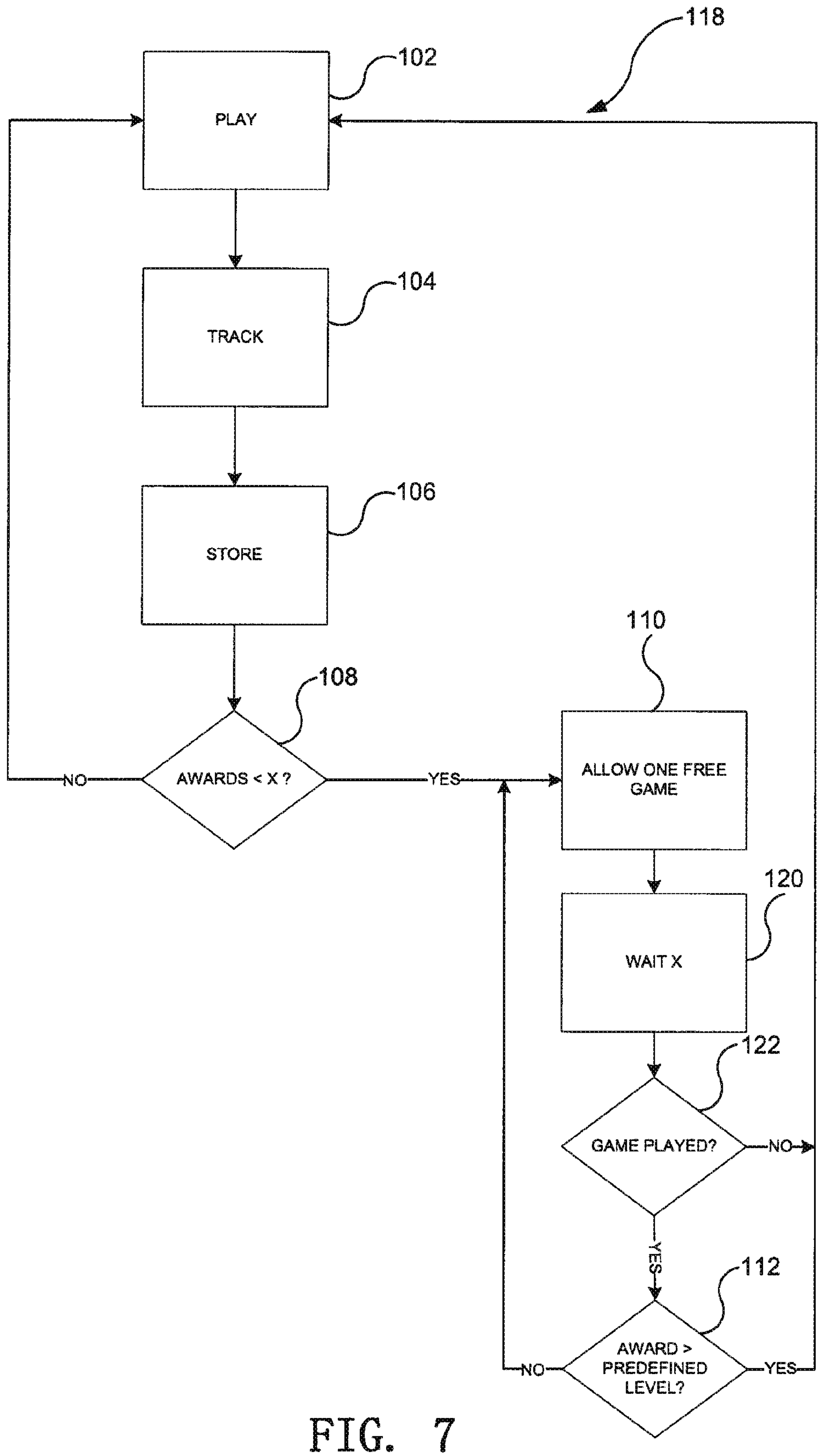
FIG. 7 is a flow chart depicting operation according to yet another embodiment of the invention.

Turning now to FIG. 7, indicated generally at 118 is a modified version of process 100. Portions of process 100 that remain substantially the same in process 118 retain the same numeral in FIG. 7. Process 118 includes a wait at 120, which is set for a predefined amount of time. After the wait, process 118 checks at 122 to see if the free game allowed at 110 has been played. If not, the free game is lost and the process returns to normal play at 102. If the free game awarded at 110 has been played, process 118 checks at 112 to see if the award is greater than a predefined level and returns to either 110 or 102 in the same manner as process 100.

Figure 8:
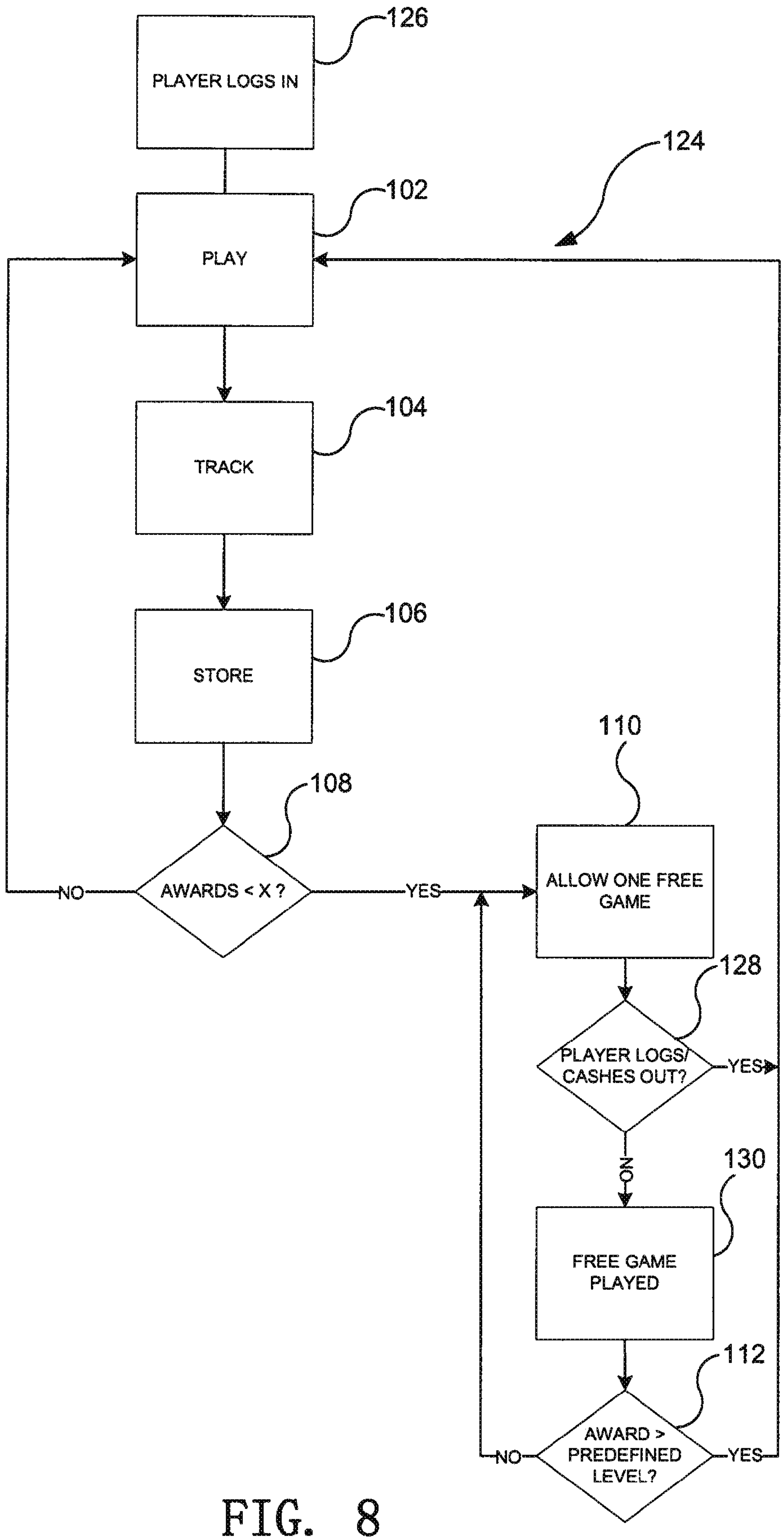
FIG. 8 is a flow chart depicting operation according to one more embodiment of the invention.

Turning now to FIG. 8, indicated generally at 124 is a modified version of process 100. Portions of process 100 that remain substantially the same in process 124 retain the same numeral in FIG. 8. Process 124 includes an optional start at 126, which is the player logging in to a player tracking system. The process checks at 128, after one free game is allowed at 110, to see if the player has either logged out or cashed out of the gaming machine. Even if a player has not logged in at 126, if process 124 determines that the player has cashed out at 128, the process returns to 102 to wait for further play. For a player who has logged in at 126, the same return to 102 is made if the player logs out at 128. The free game allowed at 110 is disallowed if the process returns to 102 via 128, whether the player has cashed out or logged out. But if the player plays the free game at 130, process 124 resumes operation at 112 in a manner similar to process 100.

Figure 9:
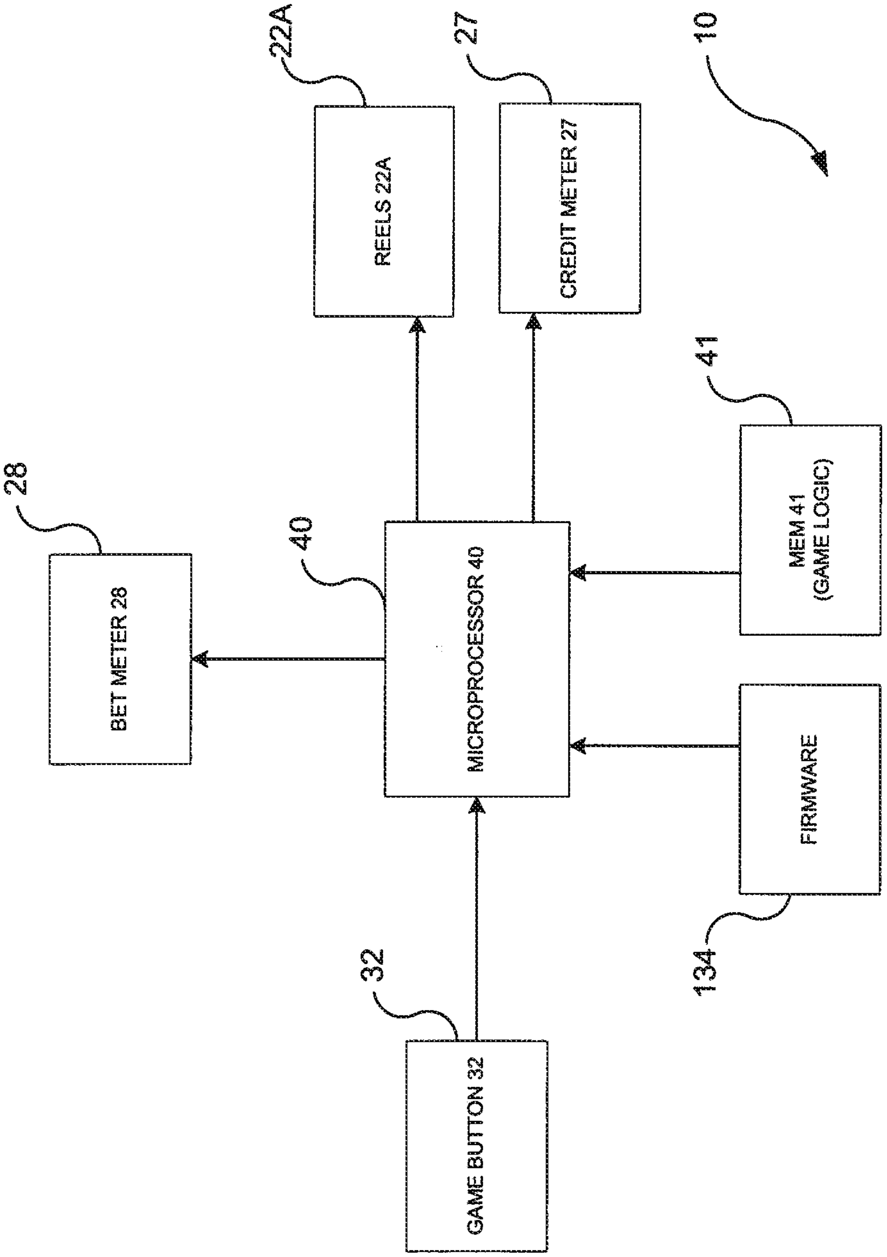
FIG. 9 is a schematic diagram of a gaming device according to an embodiment of the invention.

Turning now to FIG. 9, a schematic diagram depicts gaming device 10 constructed to operate according to an embodiment of the invention. All of the structure previously identified retains the same numeral in FIG. 9. Also included in FIG. 9 is firmware 134, which is a computer usable medium that stores code that may implement any or all, or any combination, of the processes described in connection with FIGS. 4-8. As a result, the functionality for a gaming device on network 50 can be implemented in a single gaming device 10. Firmware 134 can include what is referred to herein as an award monitor. The firmware itself may be replaced with different firmware by the operator of the gaming device and thus may be used to adjust the predefined criterion to provide free games by switching to different firmware.

As with gaming device 10, each of the functions described in the various implementations depicted in FIGS. 4-8 can all be implemented on the network, different ones can be implemented, or different combinations can be implemented. And on the network, all of these possibilities may be implemented simultaneously. In other words, different machines on the network can implement different ones—or different combinations—of the functions.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method of operating a plurality of electronic gaming devices interconnected via a network, the method comprising:

(a) receiving value from a player for wagering on one of the gaming devices via at least one of a bill acceptor, a ticket acceptor, and a coin acceptor operatively connected to each gaming device;

(b) validating one of a bill and a ticket received at one of the acceptors;

(c) applying at least some of the value to a credit meter associated with the one gaming device;

(d) receiving a wager from the applied value in response to a player-actuated input;

(e) permitting at least one player to play multiple rounds of a game on the one electronic gaming device;

(f) generating a random outcome for each round played;

(g) displaying an outcome of each round played;

(h) collecting data related to wagers made by and awards received by the player via meters at the one gaming device for each play of the game;

(i) transmitting at least some of the data over the network to a storage device in a player tracking system located on the network;

(j) accessing the player tracking system via a programmed processor;

(k) determining, via the programmed processor, from the data in the player tracking system if at least some of the stored wagers and awards, if any, are less than a predefined criterion that is a function of the wagers and awards;

(l) sending a pay command over the network to the one electronic gaming device if the game awards are less than the predefined criterion;

(m) applying a credit to a credit meter associated with the one electronic gaming device in response to the pay command;

(n) preventing the applied credit from being cashed out;

(o) permitting the player to use the applied credit to play a round of the game on the one electronic gaming device;

(p) generating a random outcome for the game played using the applied credit;

(q) determining, via the programmed processor, the value of an award, if any, resulting from the game played using the applied credit;

(r) determining, via the programmed processor, whether the value of the award resulting from the game played using the applied credit is above a predefined value;

(s) if the value of the award from the game played using the applied credit is above a predefined value, again receiving a wager from the applied value in response to a player-actuated input;

(t) if the value of the award from the game played using the applied credit is below a predefined value, again:

applying a credit to a credit meter associated with the one electronic gaming device in response to the pay command;

preventing the applied credit from being cashed out;

permitting the player to use the applied credit to play a round of the game on the one electronic gaming device;

(u) periodically performing steps (j) through (t) while the player plays the game; and (v) cashing out any remaining value on the one gaming device by at least one of printing a ticket on a ticket printer operatively connected to each gaming device, returning coins from a hopper operatively connected to each gaming device, dispensing currency from the gaming device, and transferring value to an electronic account.

2. The method of claim 1 wherein the predefined criterion comprises an amount of money.

3. The method of claim 2 wherein the amount of money comprises a function of at least one of an amount wagered by the player and an amount won by the player.

4. The method of claim 2 wherein the amount of money is related to the total awards generated as a result of game play.

5. The method of claim 1 wherein the predefined criterion comprises tracking consecutive losses after an initial wager.

6. The method of claim 1 wherein the predefined criterion comprises tracking consecutive game outcomes-that are each below a predefined level.

7. The method of claim 1 wherein the method further comprises:

permitting the player to play at least two of the electronic gaming devices; and collecting data related to wagers made by and awards received by the player via meters at a plurality of gaming devices for each play of the game system located on the network;

transmitting at least some of the data over the network to the storage device in the player tracking system located on the network; and tracking any awards associated with the outcomes on the plurality of the electronic gaming devices.

8. The method of claim 1 further comprising changing the predefined criterion from a user-operated input device operatively connected to the network.

9. The method of claim 1 further comprising:

permitting a plurality of players to play at least one of the electronic gaming devices;

establishing at least one qualification criterion for the at least one electronic gaming device to receive the pay command; and not sending the pay command unless the criterion is met.

10. A method of operating a plurality of electronic gaming devices interconnected via a network, the method comprising:

identifying a losing experience as a function of game outcomes;

storing the losing experience in a computer memory operatively connected to the network;

receiving value from a player for wagering on one of the gaming devices via at least one of a bill acceptor, a ticket acceptor, and a coin acceptor operatively connected to each gaming device;

validating one of a bill and a ticket received at one of the acceptors;

applying at least some of the value to a credit meter associated with the one gaming device;

receiving a wager from the applied value in response to a player-actuated input;

permitting a player to play at least one of the electronic gaming devices;

generating a random outcome for each game played on the one electronic gaming device;

tracking the player's play on the network;

determining whether outcomes of games played by the player comprise the losing experience;

if the outcomes of games played by the player comprise the losing experience, awarding the player a credit via a network pay command that applies the credit to a credit meter associated with the one electronic gaming device;

preventing the applied credit from being cashed out;

permitting the player to use the applied credit to play another game on the one electronic gaming device;

generating one of the random outcomes for the game played using the applied credit;

determining, via a programmed processor, whether the value of the award resulting from the game played using the applied credit comprises the losing experience;

if the value of the award from the game played using the applied credit does not qualify as the losing experience, again receiving a wager from the applied value in response to a player-actuated input; and if the value of the award from the game played using the applied credit qualifies as the losing experience, again:

applying a credit to a credit meter associated with the one electronic gaming device in response to the pay command;

preventing the applied credit from being cashed out;

permitting the player to use the applied credit to play an additional game on the one electronic gaming device; and cashing out any remaining value on the one gaming device by at least one of printing a ticket on a ticket printer operatively connected to each gaming device, returning coins from a hopper operatively connected to each gaming device, dispensing currency from the gaming device, and transferring value to an electronic account.

11. The method of claim 10 wherein the losing experience comprises a plurality of consecutive outcomes in which game awards are less than a predefined amount.

12. The method of claim 11 wherein the predefined amount is a function of the total amount wagered by the player.

13. The method of claim 10 wherein the losing experience is related to the amount of game outcomes wagered on and lost by the player.

14. The method of claim 11 wherein the first of the plurality of consecutive outcomes comprises the first outcome after the player applies an initial amount to a credit meter associated with the one electronic gaming device.

15. The method of claim 14 wherein the initial amount is above a predefined value.

16. The method of claim 10 wherein the credit applied to the credit meter associated with the one gaming device comprises a credit in an amount sufficient to play only one additional game.

17. The method of claim 12 further comprising for the game played with the applied credit and for each game played with an applied credit subsequent thereto, awarding a credit in an amount sufficient to play only one game until the player cashes out or the game outcome is associated with an award above a predefined amount.

18. The method of claim 16 further comprising after the additional game, continuing to award a credit via at least one command sent over the network in an amount sufficient to play only one game until the outcome of any of the games generates an award above a predefined amount.

19. The method of claim 18 wherein the predefined amount is zero.

20. The method of claim 10 wherein the method further comprises identifying a losing experience as a function of game outcomes via a user-operated input device located on the network.

21. The method of claim 10 wherein the method further comprises:

waiting a predefined time after awarding the player a credit;

determining whether each applied credit was used to play a game after waiting; and if the applied credit was not used to play a game, preventing the applied credit from being used to play a game.

22. The method of claim 10 wherein the method further comprises:

accepting a log in from the player as an identified player during play; and preventing the applied credit from being played if the player logs out before playing a game with applied credit.

23. The method of claim 10 further comprising:

permitting a plurality of players to play at least one of the electronic gaming devices;

establishing at least one qualification criterion for the at least one electronic gaming device to receive the command; and not sending the command unless the criterion is met.

24. A computer program product, comprising a non-transitory computer-usable medium having a computer readable program code embodied therein, said computer readable program code adapted to be executed to implement a method of operating a plurality of electronic gaming devices interconnected via a network, said method comprising:

receiving value from a player for wagering on one of the gaming devices via at least one of a bill acceptor, a ticket acceptor, and a coin acceptor operatively connected to each gaming device;

validating one of a bill and a ticket received at one of the acceptors;

applying at least some of the value to a credit meter associated with the one gaming device;

receiving a wager from the applied value in response to a player-actuated input;

permitting at least one player to play multiple rounds of a game on the one electronic gaming device;

generating a random outcome for each round played;

displaying an outcome of each round played;

collecting data related to wagers made by and awards received by the player via meters at the one gaming device;

transmitting the data over the network to a storage device located on the network;

determining, via a programmed processor, if at least some of the stored awards, if any, are less than a predefined criterion;

sending a pay command over the network to the one electronic gaming device if the game awards are less than the predefined criterion;

applying a credit to a credit meter associated with the one electronic gaming device in response to the pay command;

preventing the applied credit from being cashed out;

permitting the player to use the applied credit to play a round of the game on the one electronic gaming device;

generating a random outcome for the game played using the applied credit;

determining, via the programmed processor, the value of an award, if any, resulting from the game played using the applied credit;

determining, via the programmed processor, whether the value of the award resulting from the game played using the applied credit is above a predefined value;

if the value of the award from the game played using the applied credit is above a predefined value, again receiving a wager from the applied value in response to a player-actuated input;

if the value of the award from the game played using the applied credit is below a predefined value, again:

applying a credit to a credit meter associated with the one electronic gaming device in response to the pay command;

preventing the applied credit from being cashed out;

permitting the player to use the applied credit to play a round of the game on the one electronic gaming device; and cashing out any remaining value on the one gaming device by at least one of printing a ticket on a ticket printer operatively connected to each gaming device, returning coins from a hopper operatively connected to each gaming device, dispensing currency from the gaming device, and transferring value to an electronic account.

25. A computer program product, comprising a non-transitory computer-usable medium having a computer readable program code embodied therein, said computer readable program code adapted to be executed to implement a of operating a plurality of electronic gaming devices interconnected via a network method, said method comprising:

identifying a losing experience as a function of game outcomes;

storing the losing experience in a computer memory operatively connected to the network;

receiving value from a player for wagering on one of the gaming devices via at least one of a bill acceptor, a ticket acceptor, and a coin acceptor operatively connected to each gaming device;

validating one of a bill and a ticket received at one of the acceptors;

applying at least some of the value to a credit meter associated with the one gaming device;

receiving a wager from the applied value in response to a player-actuated input;

permitting a player to play at least one of the electronic gaming devices;

generating a random outcome for each game played on the one electronic gaming device;

tracking the player's play on the network;

determining whether outcomes of games played by the player comprise the losing experience;

if the outcomes of games played by the player comprise the losing experience, awarding the player a credit via a network pay command that applies the credit to a credit meter associated with the one electronic gaming device;

preventing the applied credit from being cashed out;

permitting the player to use the applied credit to play another game on the one electronic gaming device;

generating one of the random outcomes for the game played using the applied credit;

determining, via a programmed processor, whether the value of the award resulting from the game played using the applied credit comprises the losing experience;

if the value of the award from the game played using the applied credit does not qualify as the losing experience, again receiving a wager from the applied value in response to a player-actuated input; and if the value of the award from the game played using the applied credit qualifies as the losing experience, again:

applying a credit to a credit meter associated with the one electronic gaming device in response to the pay command;

preventing the applied credit from being cashed out;

permitting the player to use the applied credit to play a round of the game on the one electronic gaming device; and cashing out any remaining value on the one gaming device by at least one of printing a ticket on a ticket printer operatively connected to each gaming device, returning coins from a hopper operatively connected to each gaming device, dispensing currency from the gaming device, and transferring value to an electronic account.

26. An electronic gaming device comprising:

an outcome generator operable to generate random outcomes for each round of a game played;

a wager intake device adapted to receive a wager from a player for enabling a game for play;

an award table that associates at least some of the outcomes with a player award;

an award monitor constructed and arranged to track awards made; and a circuit operatively connected to the award monitor, the circuit configured to:

automatically, via a programmed processor:

enable a round of the game for play without deducting any wager when the tracked awards are less than a predefined criterion;

determine the outcome of the round of the game;

if the outcome of the round of the game results in an award that is above a predefined threshold, wait for receipt of another player action at the gaming device;

if the outcome of the round of the game results in an award that is below a predefined threshold, again automatically enable a round of the game for play without deducting any wager.

27. The electronic gaming device of claim 26 further comprising an adjuster constructed and arranged to permit changing the predefined criterion.

28. The electronic gaming device of claim 26 wherein the predefined criterion comprises an amount of money.

29. The electronic gaming device of claim 28 wherein the amount of money comprises a function of at least one of the amount wagered by the player and the awards made to the player.

30. The electronic gaming device of claim 28 wherein the amount of money is related to the total awards generated as a result of game play.

31. A gaming network comprising a plurality of electronic gaming devices according to claim 26.

* * * * *